(No Model.)
P. MURRAY.
Condenser.
No. 234,140. Patented Nov. 9, 1880.
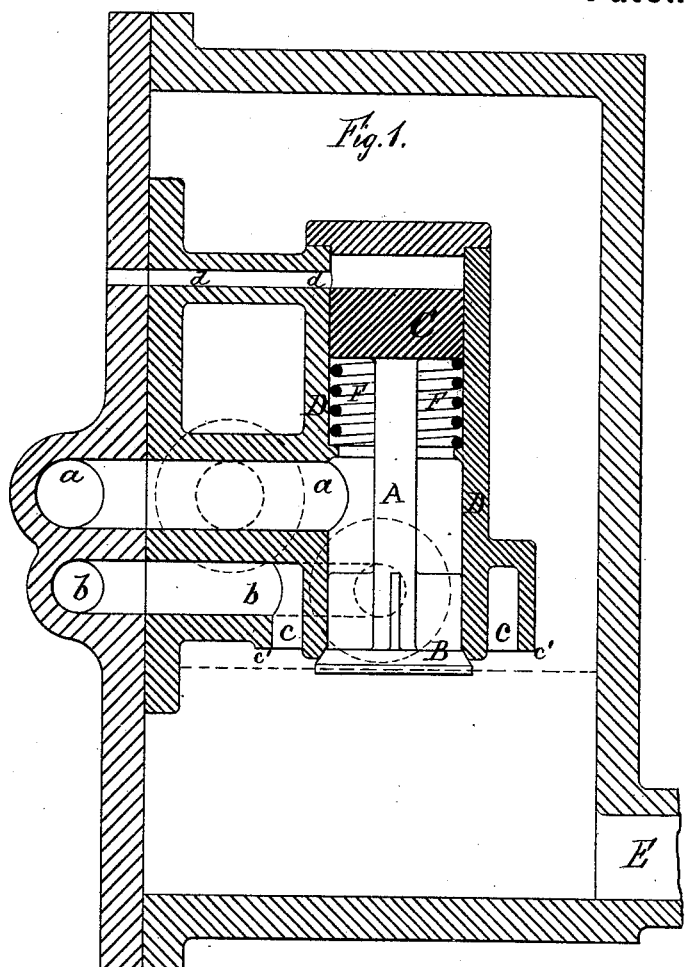
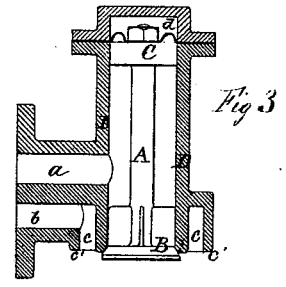
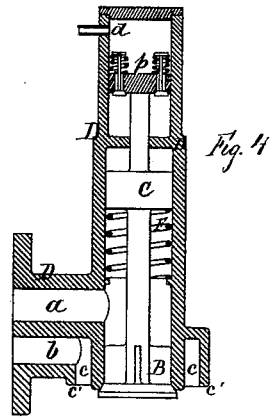
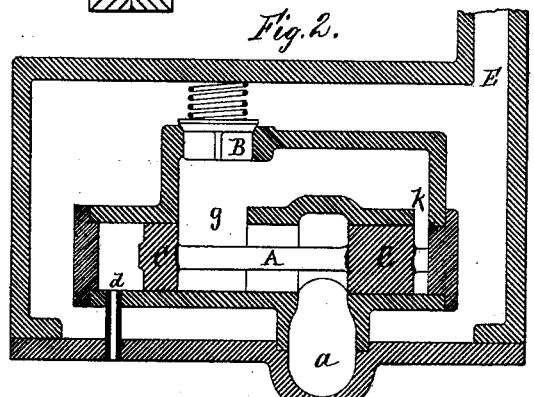
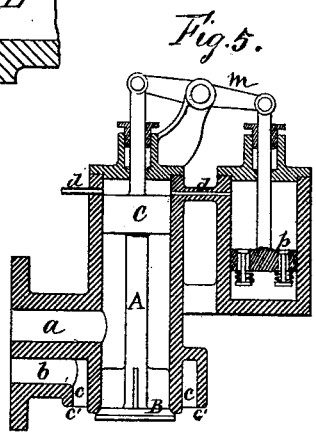
Witnesses:—
J A D'Mandelau
Harry Finckel
Inventor:—
Peter Murray
by associate attorney,
Wm H. Finckel

UNITED STATES PATENT OFFICE.

PETER MURRAY, OF NEWARK, NEW JERSEY.

CONDENSER.

SPECIFICATION forming part of Letters Patent No. 234,140, dated November 9, 1880.

Application filed April 16, 1880. (No model.)

*To all whom it may concern:*

Be it known that I, PETER MURRAY, of Newark, in the county of Essex and State of New Jersey, have invented certain new and useful Improvements in Condensers, of which the following is a specification, reference being had to the accompanying drawings.

The invention consists in certain improvements in the combination of a valve of new design to be attached to cover of condenser, either inside or outside, regulating the supply of water entering the condenser for cooling purposes.

Other improvements consist in the combination of a balanced self-regulating valve to control the supply of water to condenser, placed either inside or outside of condenser, but preferably inside.

Other improvements consist in details of construction hereinafter explained.

In the accompanying drawings, Figure 1 represents a sectional view of a condenser embodying my improvements. Figs. 2, 3, 4, and 5 represent different modifications of the same, valve-chamber, and connection arranged to take place of chamber D in condenser, Fig. 1.

Similar letters of reference indicate corresponding parts in all the figures.

A represents piston-rod connecting the piston with valve in Figs. 1, 3, 4, 5, and piston in Fig. 2.

B represents the valve for regulating the supply of water.

C represents the piston attachments for the purpose of balancing the valve.

D represents a chamber containing the whole valve-connection and attached to cover of condenser on the inside.

E represents connection for air-pump; F, regulating-spring.

*a* represents the inlet for water; *b*, inlet for steam to be condensed; *c*, an annular space around valve B, for the purpose of scattering or spreading the steam when discharged, and for it in contact with water entering through opening of valve B.

*d* represents an inlet for air, to give atmospheric pressure on top of piston C.

In the operation of this condenser water enters at the opening *a*, fills the space between the piston C and valve B, and on account of equal pressure in both directions the valve and piston remain in the same position, there being water-pressure both up and down, also atmospheric pressure on top of piston through *d*, also on under side of valve B. When the engine starts the action of air-pump through outlet E causes a vacuum on under side of valve B, opens it and allows water to run in until it reaches the valve-level, when it closes the valve B, stopping the supply of water to condenser. As the strokes of air-pump draw the water from under the valve B it again opens and allows the water to enter till the valve-level is again reached. This operation is maintained as long as the engine is working. As the engine slows down the action of the air-pump decreases and the valve C opens less often, thus controlling the supply of cold water admitted. The spring F is regulated to balance any desired vacuum and keep the condenser proportionately supplied.

The exhaust entering at *b* passes into the annular space *c*, around the valve-seat of B, scattering the steam so as to come in contact with water as it enters around the valve B when open. The edge *c'* is kept some distance above the outlet of valve, so that there is always sufficient space for the steam to enter above the level of water.

Fig. 2 is a modification used with success; but there were too many corners for grit and dirt to settle, wearing pistons so as to cause a leakage. The ram is formed of two heads, C C. The water passes them through the space *g* to K to bottom of ram. The pressure of spring upon the vacuum-valve B being greater than pressure of water, the ram would move, shutting off the supply of water. When a vacuum is formed in condenser the valve B is lifted from its seat and water continues to enter till it covers the valve B, when it closes, operating as described in Fig. 1.

Figs. 3, 4, and 5 are closer modifications of Fig. 1, the valve and piston being formed same as in Fig. 1, with slight difference in details of operation, and chambers arranged with outlets to take the place of chamber D in Fig. 1. In Fig. 3 a rubber disk is fastened to piston and joint of bonnet, and a permanent vacuum established at *d* to open valve C and allow the water to enter condenser, as shown and described for operation of Fig. 1.

Fig. 4 represents similar valve-chamber, to be attached to condenser and operated similarly with puppet-valves, forming a vacuum under the upper piston, $p$, to hold back the valve until a vacuum is formed in condenser, as before described for Fig. 1.

In Fig. 5 a lever, $m$, is attached, transferring piston $p$ to a side chamber, instead of above and in line, as in Fig. 4, an air-passage being fixed to connect to upper side of piston in both cases.

What I claim as my invention, and desire to secure by Letters Patent, is—

1. In a condenser, the combination of a valve and a balancing-piston constructed and arranged to operate substantially as described.

2. In a condenser, the combination of a vacuum-operated spring-valve, a water-inlet, an air-inlet, and a piston operated by the said valve, substantially as specified.

3. A balanced self-regulating valve for supplying cooling or condensing water to condenser or cooler attached to cover of condenser, so as to be readily removed when required, substantially as specified.

4. In a condenser, the combination of a condensing-chamber, a water-inlet, a balanced piston and valve, a steam-inlet and scattering-chamber, all arranged to operate substantially as described.

The foregoing specification of my invention in condensers signed by me this 9th day of October, A. D. 1879.

PETER MURRAY.

Witnesses:
ERNEST C. WEBB,
EDWIN A. SHORTER.